Aug. 2, 1966  J. W. WATTS ETAL  3,263,486
WELDABILITY TEST APPARATUS
Filed March 26, 1964  2 Sheets-Sheet 1
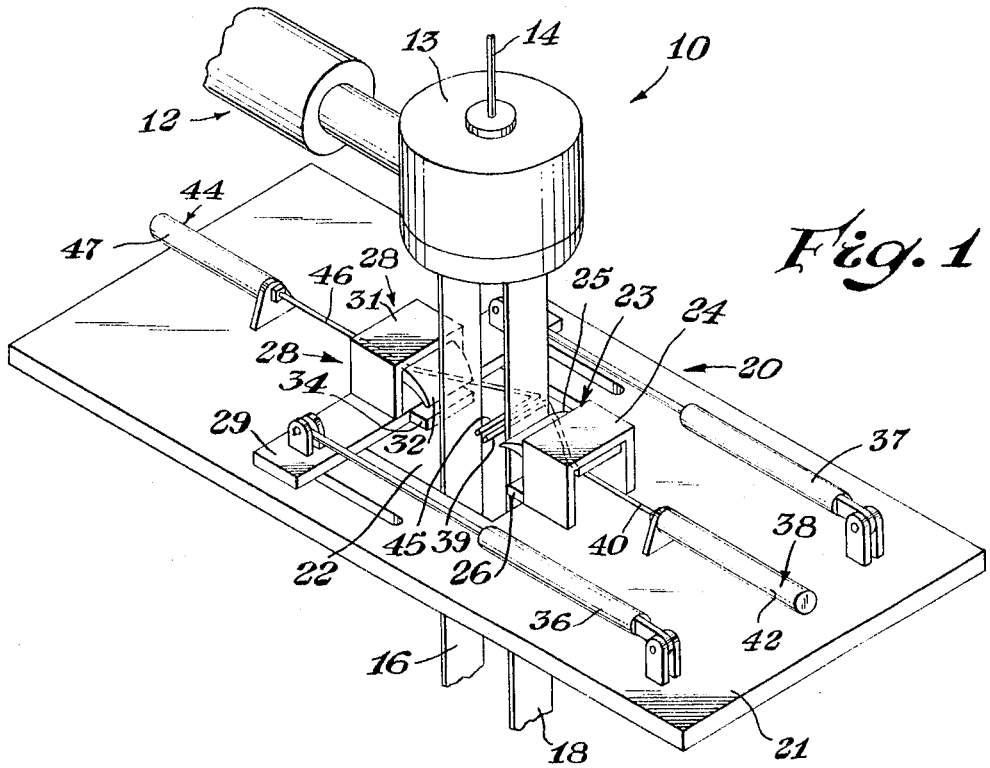
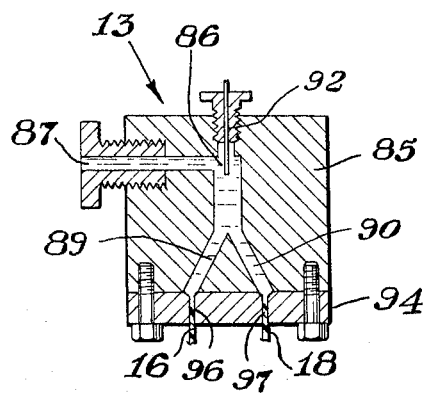
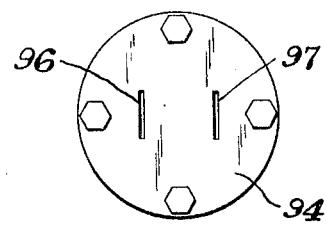
INVENTORS,
Jerry W. Watts
Earl J. Rothermel, Jr.
Robert B. Ingraham
AGENT
Jerome Rudy
ATTORNEY

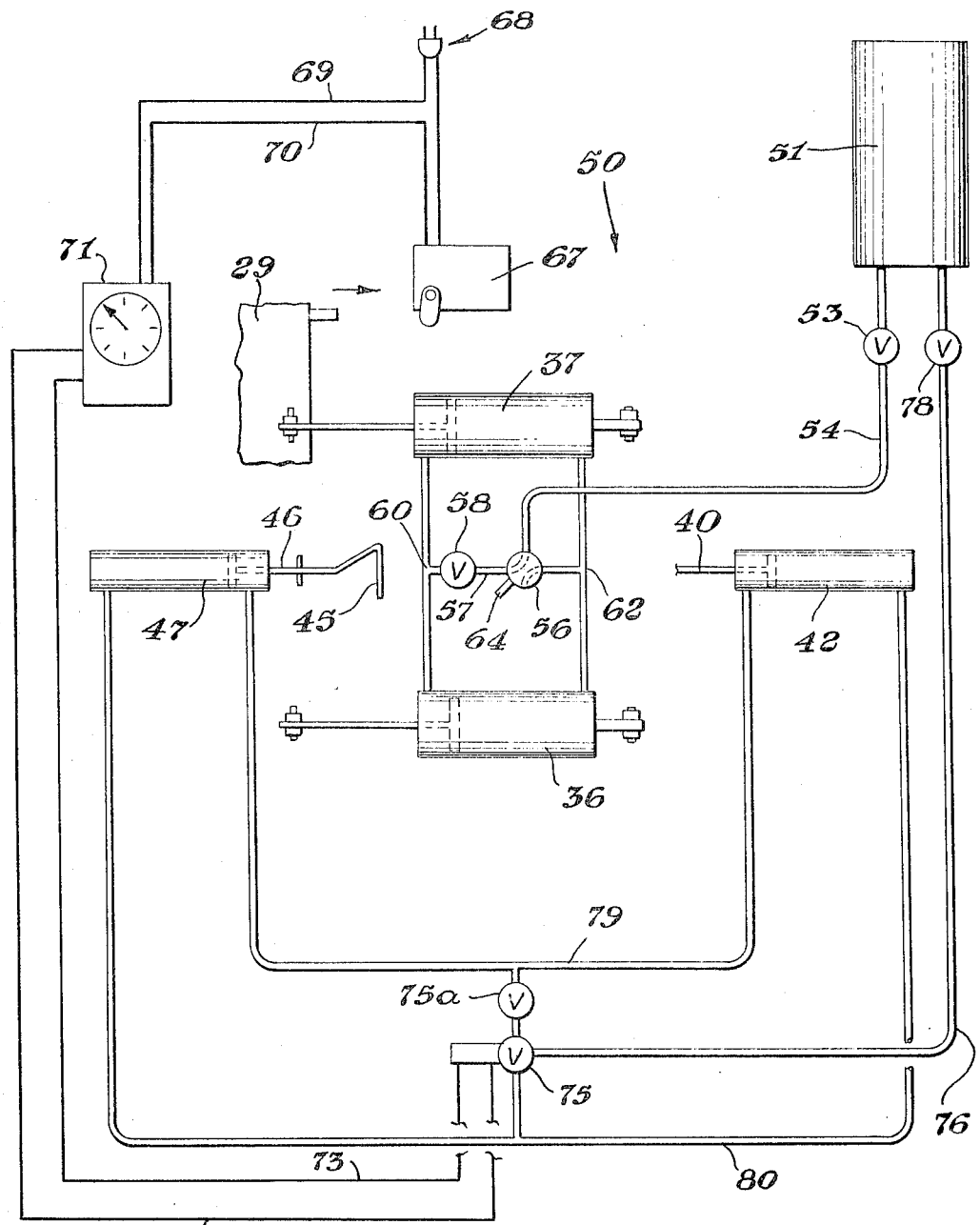

United States Patent Office 3,263,486
Patented August 2, 1966

3,263,486
WELDABILITY TEST APPARATUS
Jerry W. Watts, Baton Rouge, and Earl J. Rothermel, Jr., Baker, La., assignors to The Dow Chemical Company, Midland, Mich., a corporation of Delaware
Filed Mar. 26, 1964, Ser. No. 354,847
4 Claims. (Cl. 73—15.4)

This invention relates to an apparatus for the testing of plastics. It more particularly relates to an apparatus for evaluating the weldability of synthetic resinous thermoplastic materials.

In the processing of thermoplastic resinous materials oftentimes it is advantageous to have an evaluation of the weldability of a thermoplastic resinous or resinous composition to be used. For example, a tube is oftentimes extruded through a generally annular die. It is necessary to support the central portion or mandrel of the die and cause the plastic material to flow about such a support. Thus the heat plastified or molten resinous material is separated and joined again. When the plastic melt is brought together, usually the temperature is sufficient to allow the melt to adhere firmly together. However, probably due to the complicated rheology of high molecular weight materials, the weld or area where the portions of plastic material have come together again may not adhere to each other as well as the undivided portion of the melt. In certain applications, nonuniformities in a fabricated article can be extremely serious. For example, in the manufacture of plastic bottles by a bottle blowing technique employing the extrusion or injection molding of a parison and subsequent blowing or expanding of the parison by means of internal pressure to conform to a mold. Any failure or rupture of the parison or nonuuniformity in strength due to a weld or on a weld line will result usually in a defective product. Because of the complicated nature of many of the commercially used heat fabricating machines in many cases it is impractical to evaluate each and every resin or resin composition on a production scale.

Therefore it is an object of this invention to provide an apparatus for the evaluation of plastic welds.

A further object of this invention is to provide an apparatus for the evaluation and establishment of separating characteristics of production equipment.

A further object of the invention is to eliminate the necessity for evaluation of resins or resin compositions on production equipment.

These benefits and other advantages in accordance with the invention comprises extruding a body of thermoplastic resin into a desired configuration, pressing together portions of the body to cause them to fuse together and form a weld, and placing a stress on the weld sufficient to cause a failure if the weld is weak.

The foregoing method is particularly adapted to be practiced by the apparatus of the invention which comprises in cooperative combination an extruder having means to heat plastify a thermoplastic resinous composition and extrude it as a pair of generally parallel spaced apart strands, means to press the strands together while in a heat plastified condition at two separate locations, means to sever the portion of the two strands which are welded together from the extruded strands, means to deform the welded strands to a predetermined degree and place a stress upon the weld. These benefits and other features and advantages of the invention will become more apparent from the following specification when taken in connection with the drawing wherein:

FIGURE 1 is a schematic representation of an apparatus in accordance with the invention wherein the controls are omitted;

FIGURE 2 is a schematic representation of the controls for the apparatus of FIGURE 1;

FIGURE 3 is a sectional view of an extruder die; and

FIGURE 4 is a view of the die of FIGURE 3 along the line 4—4.

In FIGURE 1 there is illustrated a schematic representation of an apparatus 10 in accordance with the invention. For the sake of clarity the controls are illustrated separately in FIGURE 2. The apparatus 10 comprises in cooperative combination an extruder 12 having a die 13. A temperature indicating means 14 or thermocouple is disposed within the die in contact with the molten plastic material flowing therethrough. A first elongate body or ribbon 16 of thermoplastic material is extruded from the die 13. A second generally parallel elongate body or ribbon 18 of thermoplastic material is disposed generally parallel to the ribbon 16. Generally adjacent the die 13 is disposed a welding and testing apparatus generally designated by the reference numeral 20. The testing apparatus 20 comprises a frame or support 21 having defined therein an aperture 22 adapted to pass the ribbons 16 and 18. A first clamping assembly 23 is disposed adjacent the opening 22. The clamping assembly 23 comprises a support 24 having a first ribbon engaging member 25 and a second ribbon engaging member 26. Oppositely disposed from the first clamping assembly 23 is a movable or second clamping assembly 28. The assembly 28 comprises a base 29. Affixed to the base 29 is a support member 31. The support member 31 carries a first clamping edge 32 and a second clamping edge 34. The clamping edges 32 and 34 of the assembly 28 are adapted to be moved into mating engagement with the opposed corresponding clamping member. Thus edges 32 and 25 and edges 34 and 26 provide opposed surfaces of two spaced apart clamps. The movable assembly 28 is positioned by means of positioners or pneumatic cylinders 36 and 37, one end of each being secured to the support 21 and the opposite ends secured to the base 29, thus providing means to cause the assembly 28 to be moved into clamping relationship with the assembly 23. Disposed generally adjacent to the assembly 24 is a sample straining means 38. The sample straining means 38 comprises a sample engaging hook 39. The sample engaging hook 39 is mounted on the shaft 40. The shaft 40 is in turn movably supported by the positioner or air cylinder 42. The cylinder 42 is secured to the frame 21. A similar straining means 44 is positioned oppositely to the assembly 28. The straining means 44 comprises a hook member 45 adapted to engage the strand 16. The hook 45 is affixed to the shaft 46 which is operated by the air cylinder or positioning means 47. The positioning means 47 is affixed to the frame 21. In operation of the apparatus of FIGURE 1 a pair of ribbons 16 and 18 are extruded by the extruder 12 when the desired conditions or temperature is achieved in the die. The positioners or cylinders 36 and 37 cause the assemblies 23 and 28 to be moved together and clamp the ribbons 16 and 18 two places causing a fusion weld of the heat plastified ribbons at locations corresponding to the position of the clamping members 25 and 32 and the clamping members 26 and 34. When the ribbons have been clamped for a predetermined length of time they are released. The loop of thermoplastic material formed by the welding of the two ribbons is severed from the extrude. The hooks 39 and 45 are caused to move apart at a predetermined rate and thus strain the welds generated by the clamping action.

In FIGURE 2 there is illustrated schematically the control system 50 employed with the apparatus of FIGURE 1. The control system 50 comprises an air supply means 51. Air from the supply means 51 is in communication with a pressure regulator 53 disposed in the air line 54. A "4 way" valve 56 terminates the air line 54. The "4 way" valve 56 is connected with the cylinders 36 and 37 by means of the line 57 having a regulating valve 58. The side of the valve 58 remote from the valve 56 is in communication with the line 60 which feeds one of the ports of the cylinders 36 and 37. The valve 56 is also in communication with the remaining ports of the cylinders 36 and 37 by means of the line 62. The valve 56 is provided with a discharge 64. Pressure regulated air is provided in the line 54 to the valve 56 which, in the position illustrated in FIGURE 2, leads the air through the regulating valve 58 at a control rate into the air cylinders 36 and 37, thus forcing the pistons into the cylinder and causing the clamp base 29 to move toward the fixed clamping assembly 23. A switch 67 is positioned adjacent the base 29 and is activated thereby. An electrical power source 68 is controlled by the switch 67. The controlled power flows through the lines 69 and 70 to a timing controller 71. The controller 71 provides a signal through the lines 72 and 73 to a solenoid operated 4 way valve 75. The solenoid valve 75 is in communication with the air supply 51 through the line 76 which has disposed therein a pressure regulator 78. The output from the valve 75 is connected to the air cylinders 42 and 47 by the regulating valve 75a and the lines 79 and 80. The flow pattern is substantially identical with the flow pattern employed with the cylinders 36, 37, and the valve 56. Thus, entry of air into the cylinders 42 and 47 through the valve 79 causes the rods 40 and 46 to be withdrawn, thereby straining the welded sample.

In operation of the apparatus of FIGURES 1 and 2, activation of the valve 56 causes clamping at a rate determined by the air pressure and the setting of the valve 58. On compression of the stroke of the cylinders 36 and 37 (and therefore completion of the clamping operation) the timer is actuated and after a predetermined length of time, air at a rate determined by the regulator 78 and the regulating valve 75a enters the cylinders 42 and 47, thereby causing the hook members 39 and 45 to strain the sample.

In FIGURE 3 there is illustrated a sectional view of a die 13. The die 13 comprises a die body 85. The die body 85 defines a bifurcated passageway 86 having an entrance 87 and discharge arms 89 and 90. Disposed within the passageway 86 is a temperature indicating means or thermocouple 92. Adjacent the discharge portions 89 and 90 of the passageway 86 is a die plate 94. The die plate 94 is rigidly secured to the die body 85 and has defined therein a pair of apertures 96 and 97 from which are issuing the ribbons 16 and 18.

FIGURE 4 depicts a view of the die plate 94 illustrating the generally parallel arrangements of the apertures 96 and 97.

Apparatus substantially as illustrated in the accompanying drawings has been successfully employed to predict operating conditions and weldability for polyethylene resinous compositions utilized in the blowing of bottles wherein a split mold is employed and welding of the parison is employed to form integral handles and the like.

As is apparent from the foregoing specification, the apparatus of the present invention is susceptible of being embodied with various alterations and modifications which may differ particularly from those that have been described in the preceding specification and description. For this reason, it is to be fully understod that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for evaluating the weldability of thermoplastic resinous materials comprising in cooperative combination an extruder having means to heat plastify a thermoplastic resinous composition and extrude the composition as a pair of generally parallel spaced-apart strands, means to press the strands together while in a heat plastified condition at two separate locations, means to sever the portions of the two strands which are welded together from the extruded strands, means to deform the welded strands to a predetermined degree and place a stress upon the welds.

2. The apparatus of claim 1 including a sequence controller which on pressing of the strands together initiates a timing device which activates the means to deform the welds at a predetermined period of time after welding.

3. The apparatus of claim 2 including means to determine the temperature of the thermoplastic resinous material immediately prior to extrusion.

4. A thermoplastic weld testing apparatus comprising in cooperative combination an extruder adapted to extrude a pair of generally similar heat plastified thermoplastic resinous ribbons in generally parallel side by side relationship, a welding and shearing assembly comprising a fixed clamping member having a first jaw and a second jaw, a movable clamping member oppositely disposed from the first clamping member, the second clamping member having a first jaw and a second jaw, the first jaws and second jaws of the first clamping assembly and second clamping assembly adapted to engage the corresponding jaws when the second clamping member is moved toward the first clamping member, the jaws so constructed and arranged so as to cause the extruded ribbons to weld together when the temperature of the ribbons is sufficiently high to permit such welding, the first jaws of the first and second clamping assemblies being generally adjacent to the extrusion die and the second jaws remote from the extrusion die, the first jaws so constructed and arranged so as to sever the extruded ribbons at a location remote from the second jaws, and thereby form a loop in the extruded ribbons, a straining means positioned generally adjacent to the first and second clamping assemblies and adapted to engage the loop formed thereby and place a predetermined strain thereon at a predetermined time after the loop has been formed and severed.

References Cited by the Examiner

UNITED STATES PATENTS 3,141,196    7/1964    Langecker _____ 18—5

RICHARD C. QUEISSER, *Primary Examiner.*

JACK C. GOLDSTEIN, *Assistant Examiner.*